(12) United States Patent
Walch (10) Patent No.: US 6,189,306 B1
(45) Date of Patent: Feb. 20, 2001

(54) AGRICULTURAL MACHINE COMPRISING A PIVOTABLE DRAWBAR AND TRANSMISSION MEMBERS COMPRISING A COUPLING WITH UNIVERSAL JOINTS

(75) Inventor: Martin Walch, Dettwiller (FR)

(73) Assignee: Kuhn S.A., Saverne (FR)

( * ) Notice: Under 35 U.S.C. 154(b), the term of this patent shall be extended for 0 days.

(21) Appl. No.: 09/397,095

(22) Filed: Sep. 16, 1999

(30) Foreign Application Priority Data

Feb. 10, 1998 (FR) .................................................. 98 12523

(51) Int. Cl.[7] .......................... A01D 34/24; A01D 34/42; A01D 34/63
(52) U.S. Cl. ................................ 56/15.1; 56/15.3; 56/228
(58) Field of Search ..................................... 56/15.1, 15.3, 56/6, 15.2, 15.7, 16.7, 12.6, DIG. 14, 228; 280/494, 492, 493

(56) References Cited

U.S. PATENT DOCUMENTS

| | | |
|---|---|---|
| 2,615,294 | 10/1952 | Dray . |
| 4,610,128 | 9/1986 | Ermacora . |
| 4,669,256 | 6/1987 | Ermacora et al. . |
| 4,694,640 | 9/1987 | Ermacora et al. . |
| 4,714,123 | 12/1987 | Ermacora et al. . |
| 4,719,742 | 1/1988 | Ermacora et al. . |
| 4,720,964 | 1/1988 | Ermacora et al. . |
| 4,723,396 | 2/1988 | Ermacora . |
| 4,763,463 | 8/1988 | Ermacora et al. . |
| 4,771,591 | 9/1988 | Ermacora . |
| 4,811,553 | 3/1989 | Ermacora et al. . |
| 4,833,868 | 5/1989 | Ermacora et al. . |
| 4,848,069 | 7/1989 | Ermacora et al. . |
| 4,947,629 | 8/1990 | Ermacora et al. . |
| 4,986,064 | 1/1991 | Ermacora . |
| 4,991,383 | 2/1991 | Ermacora . |
| 5,060,462 | 10/1991 | Helfer et al. . |
| 5,094,063 | 3/1992 | Wattron et al. . |
| 5,107,663 | 4/1992 | Wattron et al. . |
| 5,136,828 | 8/1992 | Ermacora . |
| 5,199,249 | 4/1993 | Wattron et al. . |
| 5,199,250 | 4/1993 | Ermacora et al. . |
| 5,272,859 | * 12/1993 | Pruitt et al. ............................ 56/15.2 |
| 5,357,737 | 10/1994 | Ermacora et al. . |
| 5,417,042 | 5/1995 | Walch et al. . |
| 5,423,165 | 6/1995 | Walch et al. . |
| 5,507,136 | 4/1996 | Walch . |
| 5,522,208 | 6/1996 | Wattron . |
| 5,660,032 | 8/1997 | Neuerburg et al. . |
| 5,749,390 | 5/1998 | Ermacora et al. . |
| 5,794,424 | 8/1998 | Ermacora et al. . |
| 5,852,921 | 12/1998 | Neuerburg et al. . |
| 5,857,314 | 1/1999 | Wolff . |
| 5,901,533 | 5/1999 | Ermacora et al. . |
| 5,901,537 | 5/1999 | Walch et al. . |
| 6,003,291 | * 12/1999 | Ermacora et al. ......................... 56/6 |
| 6,055,800 | * 5/2000 | Walch ................................... 56/16.7 |

FOREIGN PATENT DOCUMENTS

| | | |
|---|---|---|
| 94 14 597 U1 | 2/1995 | (DE) . |
| 0 277 343 A1 | 8/1988 | (EP) . |
| 0 406 961 A1 | 1/1991 | (EP) . |
| 0 823 199 A2 | 2/1998 | (EP) . |
| 2 760 934 A1 | 9/1998 | (FR) . |
| WO 93/20680 | 10/1993 | (WO) . |

* cited by examiner

Primary Examiner—Robert E. Pezzuto
Assistant Examiner—Arpad Fabian Kovacs
(74) Attorney, Agent, or Firm—Oblon, Spivak, McClelland, Maier & Neustadt, P.C.

(57) ABSTRACT

Agricultural harvester comprising a chassis; a drawbar connected to the chassis at a first articulation of geometric axis; transmission members comprising a first set comprising at least a first drive shaft, a second set comprising at least one input shaft of rotation axis, a coupling. The axis of rotation of the input shaft is offset with respect to the geometric axis of the first articulation; the first drive shaft or the coupling are guided in rotation in a carrier member connected to the chassis at another articulation, the geometric axis of which is at least roughly vertical and at least roughly intersects the axis of rotation of the input shaft; and an orientation member is connected between the carrier member and the drawbar.

22 Claims, 9 Drawing Sheets

AGRICULTURAL MACHINE COMPRISING A PIVOTABLE DRAWBAR AND TRANSMISSION MEMBERS COMPRISING A COUPLING WITH UNIVERSAL JOINTS

BACKGROUND OF THE INVENTION

Field of the Invention

The present invention relates to an agricultural harvester comprising:

- a chassis extending, during work, transversely to the direction of forward travel;
- a harvester mechanism suspended moveably in the chassis by means of a suspension device;
- a drawbar connected to the chassis by means of a first articulation, the geometric axis of which is at least roughly vertical, said drawbar being intended to connect the harvester to a tractor vehicle;
- transmission members intended to transmit the motion from a source of motor power to the harvester mechanism and comprising, in particular:
  - a first set supported by the drawbar and comprising at least a first drive shaft;
  - a second set supported by the chassis and comprising at least one input shaft, the axis of rotation of which is, during work, directed at least roughly in the direction of forward travel;
  - a coupling comprising a universal joint by means of which it is connected to the first drive shaft and another universal joint by means of which it is connected to the input shaft.

Discussion of the Background

Known in the state of the art is a document EP 0 823 199 A2 which describes such an agricultural harvester which, broadly speaking, comprises a chassis, a harvester mechanism, a drawbar and transmission members.

The drawbar is, on the one hand, connected to the chassis by means of a first articulation, the geometric axis of which is at least roughly vertical and, on the other hand, intended to be connected to a tractor vehicle.

The transmission members, for their part, are intended to transmit the motion from a source of motor power to the harvester mechanism, and comprise:

- a first set supported by the drawbar and comprising at least a first drive shaft;
- a second set supported by the chassis and comprising an input shaft, the axis of rotation of which is, during work, directed roughly in the direction of forward travel; and
- a coupling comprising a first universal joint by means of which it is connected to the first drive shaft and a second universal joint by means of which it is connected to the input shaft.

To be able to work on both sides of the track of the tractor vehicle alternately, using this known agricultural harvester, the chassis can be pivoted with respect to the drawbar into at least two work positions about the first articulation. For this purpose, to ensure correct transmission of motion and allow the first universal joint and the second universal joint of the coupling to operate under suitable conditions, the drawbar comprises, in the region of the first articulation, a yoke, between the wings of which the coupling extends.

An embodiment of this kind does, however, display a number of drawbacks.

Specifically, the drawbar consists mainly of a very long mechanical assembly. To produce the yoke correctly and avoid deformations due to welding, this yoke has to be manufactured after said drawbar has been welded. This is an operation which is complicated to perform because of the size of said drawbar. It requires substantial facilities, and this then results in a very high production cost.

In addition, in order to give this yoke mounting good mechanical strength, it is necessary to use large size components, and this has the effect of further increasing the cost of production.

SUMMARY OF THE INVENTION

The object of the present invention is to overcome these aforementioned drawbacks while at the same time ensuring that the agricultural harvester in question will operate correctly.

To this end, the agricultural harvester according to the invention is one wherein:

- the axis of rotation of the input shaft is offset with respect to the geometric axis of the first articulation connecting the drawbar to the chassis;
- the first drive shaft or the coupling are guided in rotation in a carrier member connected to the chassis by means of another articulation, the geometric axis of which is at least roughly vertical and at least roughly intersects the axis of rotation of the input shaft;
- an orientation member is connected between the carrier member and the drawbar.

The invention also relates to the following features taken in isolation or in any technically feasible combination:

- the universal joint and the other universal joint of the coupling may have a rigid double pair of jaws;
- the connection between the universal joint and the first drive shaft may be a connection that can slide along the axis of rotation thereof;
- the connection between the other universal joint and the input shaft may be a connection that can slide along the axis of rotation thereof;
- a corresponding pair of jaws of the universal joint may be stationary with respect to the first drive shaft and the first drive shaft may be a telescopic shaft;
- a corresponding pair of jaws of the universal joint may be stationary with respect to the first drive shaft and a corresponding pair of jaws of the other universal joint may also be stationary with respect to the input shaft, the universal joint and the other universal joint then being telescopic with respect to one another along a geometric axis that passes through the centers of the two universal joints;
- the first drive shaft or a corresponding pair of jaws of the universal joint may be guided in rotation in the carrier member, the geometric axis of the other articulation connecting the carrier member to the chassis then intersecting the geometric axis passing through the centers of the two universal joints at least roughly midway between said centers when the drawbar is in a position at least roughly orthogonal to the chassis;
- that part of the coupling that lies between the two universal joints may be guided in rotation in the carrier member, the geometric axis of the other articulation connecting the carrier member to the chassis then passing at least roughly through the center of the other universal joint;
- the geometric axis of the first articulation and the geometric axis of the other articulation may extend at least roughly in a vertical plane which runs at least roughly orthogonally to the direction of forward travel during work;

the orientation member may form a deformable quadrilateral with the drawbar, the chassis and the carrier member;

this quadrilateral may be at least roughly a parallelogram;

the orientation member may consist of a strut articulated between the drawbar and the carrier member;

in side view, the geometric axis of the other articulation, considered from the bottom upward, may be inclined forward slightly;

in side view, the geometric axis of the first articulation, considered from the bottom upward, may be inclined backward slightly;

the first set of transmission members may comprise a second drive shaft which transmits the motion from the front of the drawbar to the first drive shaft, the first drive shaft and the second drive shaft then being coupled to one another by means of a second coupling;

this second coupling may consist of a universal joint;

the first drive shaft and the second drive shaft may be supported directly by the drawbar by means of a single bearing extending in the vicinity of the second coupling;

this bearing may be connected to the drawbar by means of elastic rests;

this bearing may furthermore be mounted on the second drive shaft;

the axis of rotation of the second drive shaft may be at least roughly coincident with the longitudinal axis of the drawbar;

the coupling may extend out of the drawbar and the first drive shaft may emerge from the drawbar, a guard then being provided which at least roughly envelops the coupling and that part of the first drive shaft which emerges from the drawbar;

the drawbar may be pivoted into a transport position in which it extends at least roughly parallel to the chassis, the axis of rotation of the input shaft then extending, with respect to the first articulation, on the opposite side to the side on which the drawbar extends in the transport position.

BRIEF DESCRIPTION OF THE DRAWINGS

Other objects and features of the invention will emerge from the description hereinbelow with reference to the appended drawings which, by way of nonlimiting examples, depict embodiments of the agricultural harvester according to the invention.

In these drawings.

DESCRIPTION OF THE PREFERRED EMBODIMENTS

FIGS. 1 to 6 show an agricultural harvester which, according to the embodiment depicted, is a mower 1.

This mower 1 comprises, broadly speaking, a chassis 2, a harvester mechanism 3, a drawbar 4 and transmission members 5.

The chassis 2, particularly in the work position, extends transversely to the direction of forward travel 7 and comprises, in the embodiment depicted, two wheels 8 by means of which it can be moved along.

In the rest of the description, the ideas of "front", "rear", "in front of" and "behind" are defined with respect to the direction of forward travel 7 indicated by the direction-of-forward-travel 7 arrow, and the ideas of "right" and "left" are defined looking at the mower 1 from behind, in the direction of forward travel 7.

The harvester mechanism 3 comprises cutting members 9 which are intended to cut the standing crop, and is suspended moveably in the chassis 2 by means of a suspension device 10.

The drawbar 4 is, for its part, connected, on the one hand, at its front end 12 to a tractor vehicle 13 in a way known to those skilled in the art, and, on the other hand, at its rear end 14 to the chassis 2 by means of a first articulation 15, the geometric axis 15a of which is at least roughly vertical and lies at least roughly in a midplane 17 parallel to the direction of forward travel 7 and extending roughly midway between the lateral ends 18, 19 of said chassis 2. When viewed from the side, and considered from the bottom upward, the geometric axis 15a of this first articulation 15 may be inclined backward slightly.

Figure 1:
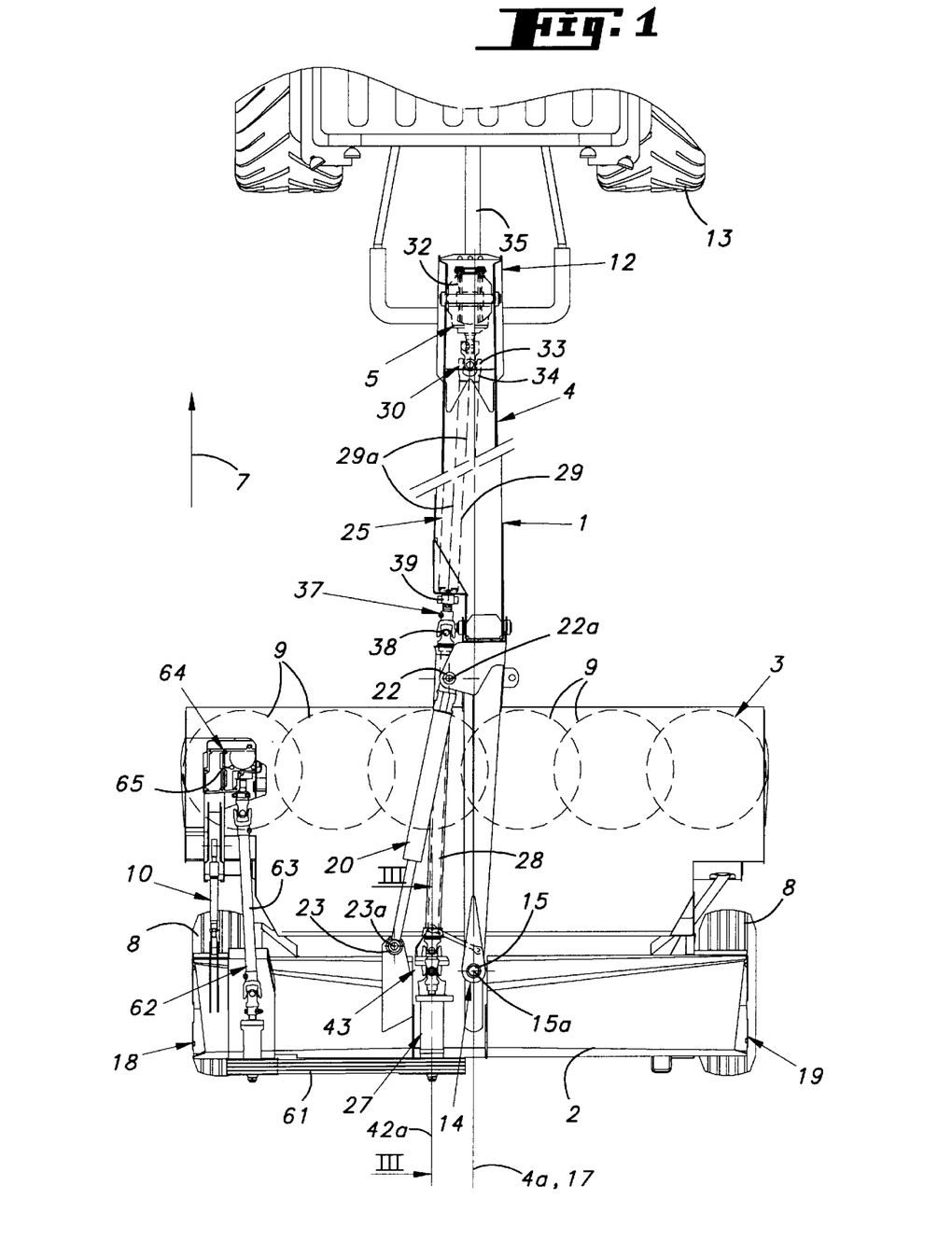
FIG. 1 depicts a view from above, partially in section, of an agricultural harvester according to the invention in a transport position.
Figure 2:
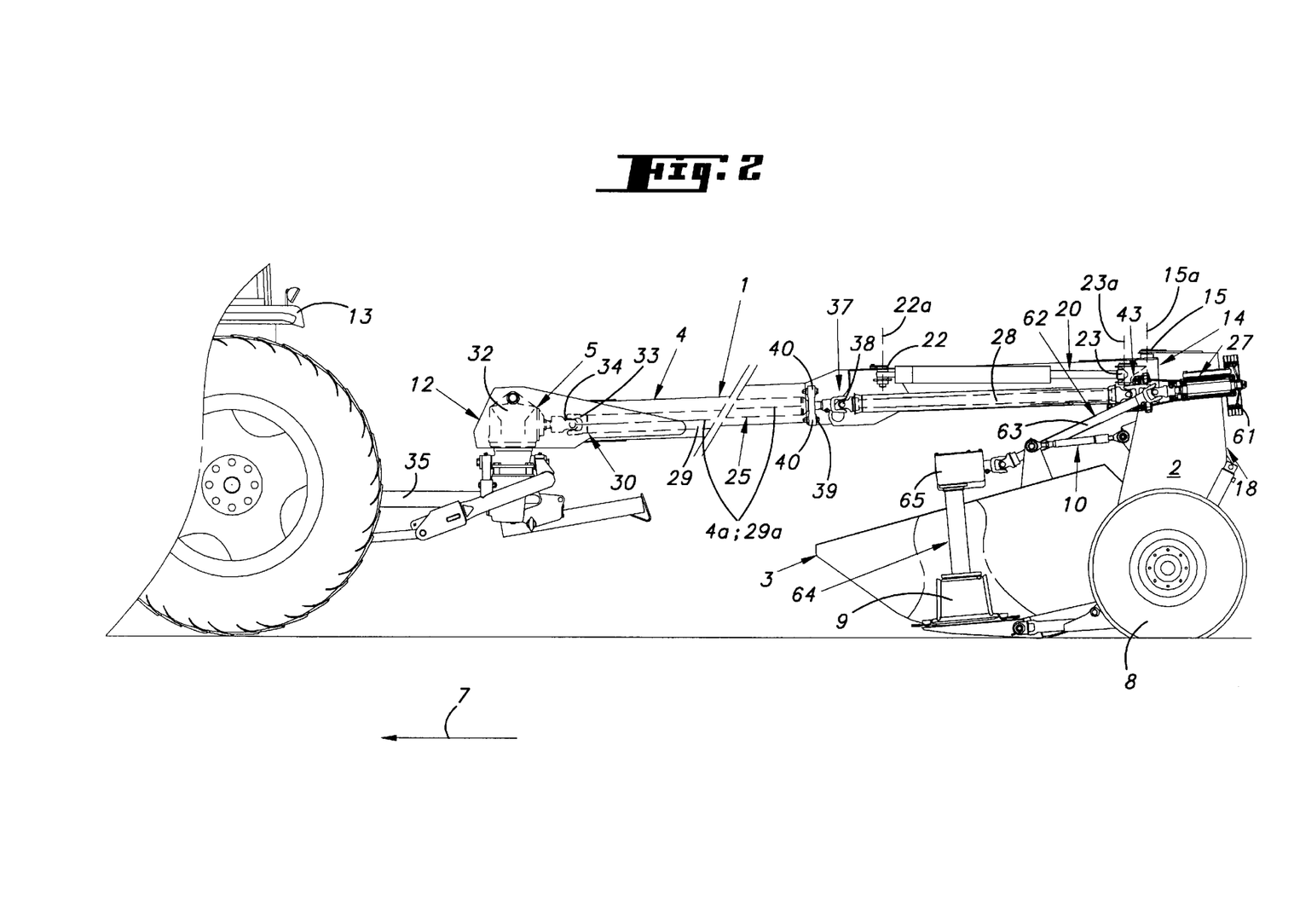
FIG. 2 depicts a view from the side, partially in section, of the agricultural harvester of FIG. 1.

In FIGS. 1 and 2 it can also be seen that there is an operating element 20 consisting, in the embodiment depicted, of a ram.

This operating element 20 is intended to pivot the chassis 2 with the harvester mechanism 3 about the geometric axis 15a of the first articulation 15 so as to bring the mower 1 from the transport position into a work position to the right or to the left, in which position said chassis 2 and said harvester mechanism 3 extend to the right or to the left of the track of the tractor vehicle 13. For this purpose, the operating element 20 is connected, on the one hand, to the drawbar 4 by means of a second articulation 22, the geometric axis 22a of which is roughly parallel to the geometric axis 15a of the first articulation 15 and, on the other hand, to the chassis 2 by means of a third articulation 23, the geometric axis 23a of which is also roughly parallel to said geometric axis 15a.

The transmission members 5 are, for their part, intended to transmit the motion from a source of motor power which, in the embodiment depicted, consists of the tractor vehicle 13, to the harvester mechanism 3.

For this purpose, the transmission members 5 particularly comprise a first set 25 supported by the drawbar 4 and a second set 27 supported by the chassis 2.

According to the embodiment depicted, the first set 25 comprises a first drive shaft 28 and a second drive shaft 29. The second drive shaft 29 is coupled, at its front end 30 to a first transmission gearbox 32 by means of a first coupling 33 consisting of a first universal joint 34. This transmission gearbox 32 is located at the front end 12 of the drawbar 4 and is coupled to the tractor vehicle 13 by means of a first transmission shaft 35 with universal joints. The second drive shaft 29 transmits motion from the front of the drawbar 4 to the first drive shaft 28. For this purpose, the first drive shaft 28 and the second drive shaft 29 are coupled to each other by means of a second coupling 37 consisting of a second universal joint 38. In FIGS. 1 and 2, it can also be seen that the first drive shaft 28 and the second drive shaft 29 are supported by the drawbar 4 by means of a single bearing 39 extending in the vicinity of the second coupling 37. This bearing 39 is connected to the drawbar 4 by means of elastic rests 40 which allow vibration to be filtered out during work, make it easier for the drive shafts 28, 29 to be mounted and absorb deformation of said drawbar 4 during work. More specifically, it may also be seen that the bearing 39 is mounted on the second drive shaft 29 and that the axis 29a of rotation thereof is at least roughly coincident with the longitudinal axis 4a of the drawbar 4.

The second set 27, for its part, comprises an input shaft 42, the axis 42a of rotation of which is, during work, at least roughly directed in the direction of forward travel 7 and is offset with respect to the geometric axis 15a of the first articulation 15.

The first set 25 and the second set 27 are connected to each other by means of a third coupling 43. This third coupling 43 first of all comprises a third universal joint 44 by means of which it is connected to the first drive shaft 28. The third coupling 43 then comprises a fourth universal joint 45 by means of which it is connected to the input shaft 42.

This third coupling 43 is guided in rotation in a carrier member 47 connected to the chassis 2 by means of a fourth articulation 48, the geometric axis 48a of which is at least roughly vertical and at least roughly intersects the axis 42a of rotation of the input shaft 42 at an angle of about 90°. This geometric axis 48a is also, when viewed from the side and considered from the bottom upward, inclined forward slightly.

In the various figures, it can also be seen that the third coupling 43 extends out from the drawbar 4 and that the first drive shaft 28 emerges from said drawbar 4.

According to the embodiment depicted, it can be seen more specifically in the various figures, that the first drive shaft 28 extends out of the drawbar 4 and that there is also a guard 49 which at least partially envelops the third coupling 43 and that part of said first drive shaft 28 which extends out of said drawbar 4.

Figure 3:
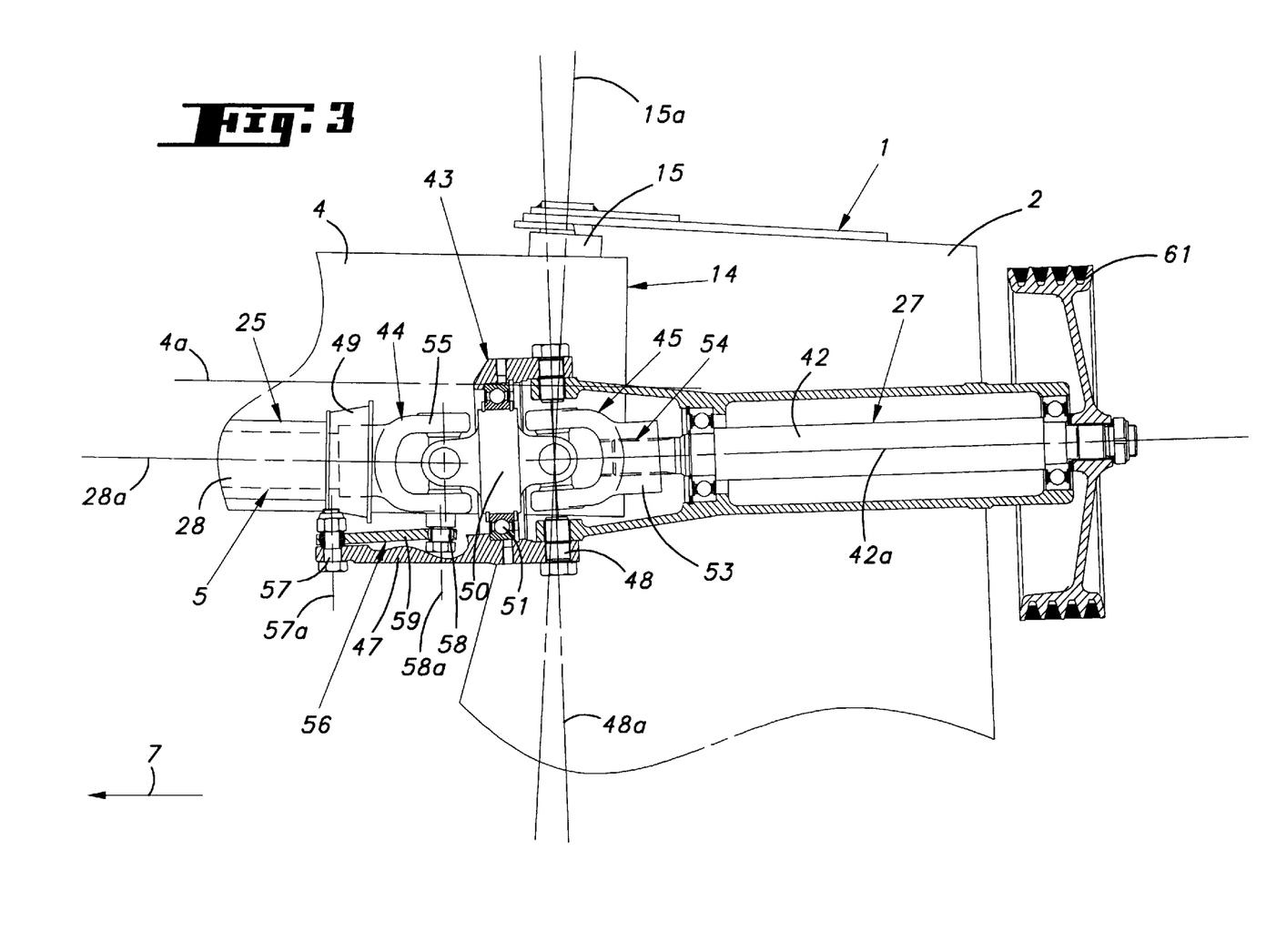
FIG. 3 depicts, to a different scale, a view in section in the plane III—III defined in FIG. 1.

In FIG. 3 in particular, it can also be seen that the universal joints 44, 45 of the third coupling 43 comprise a rigid double pair of jaws 50. This rigid double pair of jaws 50 is guided in rotation in the carrier member 47 by means of a rolling bearing 51.

It will also be noted that the geometric axis 48a of the fourth articulation 48 passes at least roughly through the center of the fourth universal joint 45 and this advantageously allows the rigid double pair of jaws 50 and the carrier member 47 to pivot about said geometric axis 48a while at the same time transmitting said motion correctly.

Figure 4:
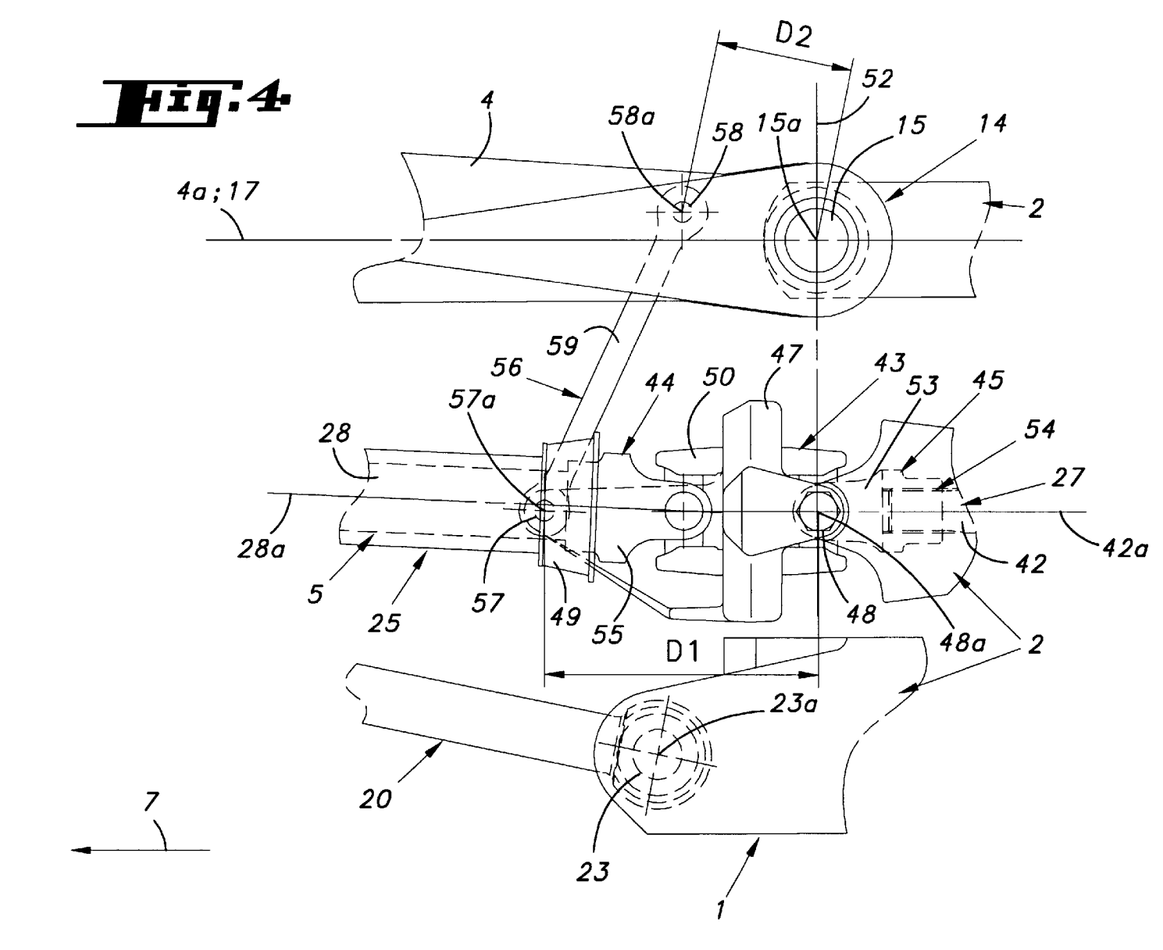
FIG. 4 depicts, to a different scale, part of the agricultural harvester of FIG. 1.
Figure 5:
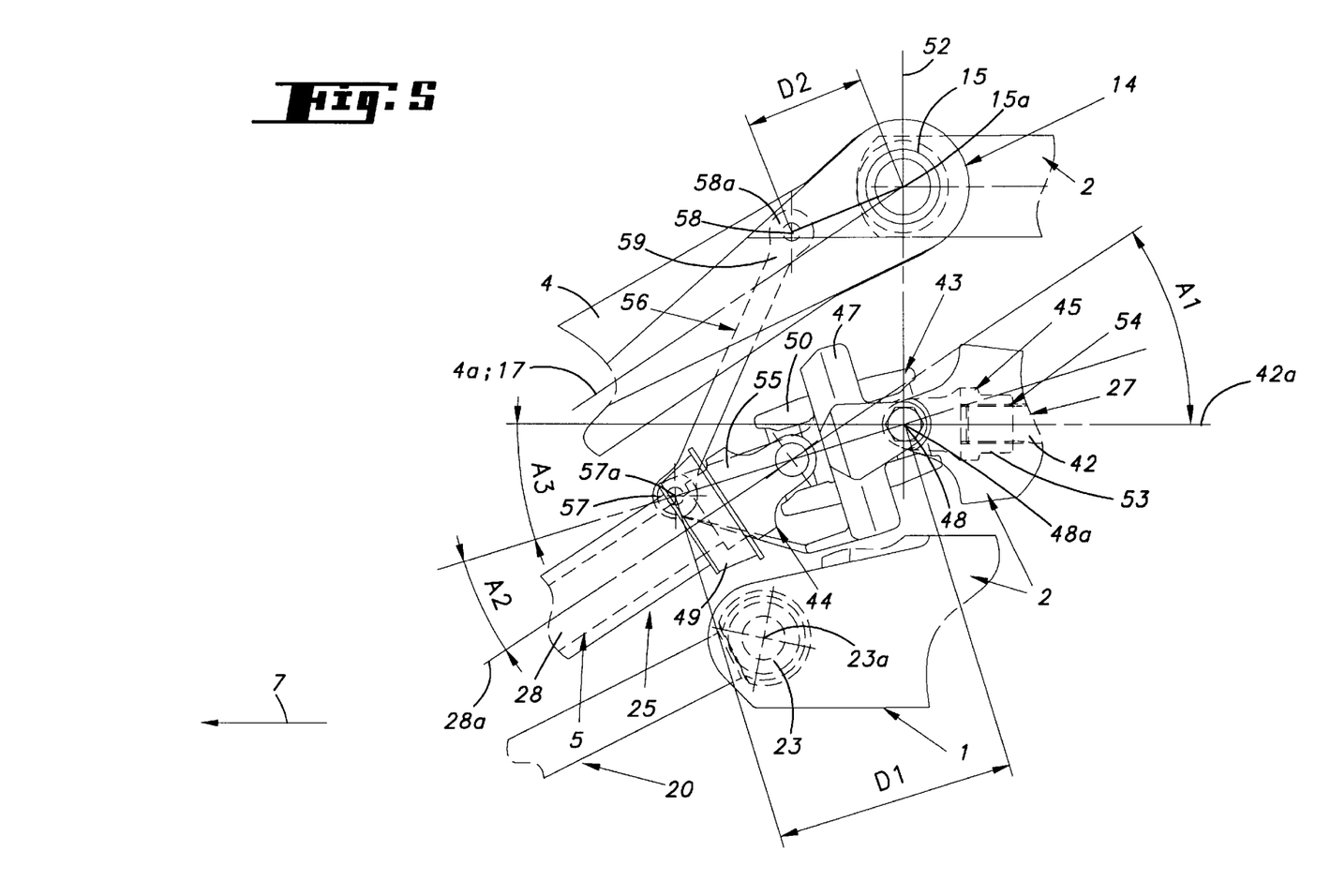
FIG. 5 depicts the same components as FIG. 4, but in a working position to the right.
Figure 6:
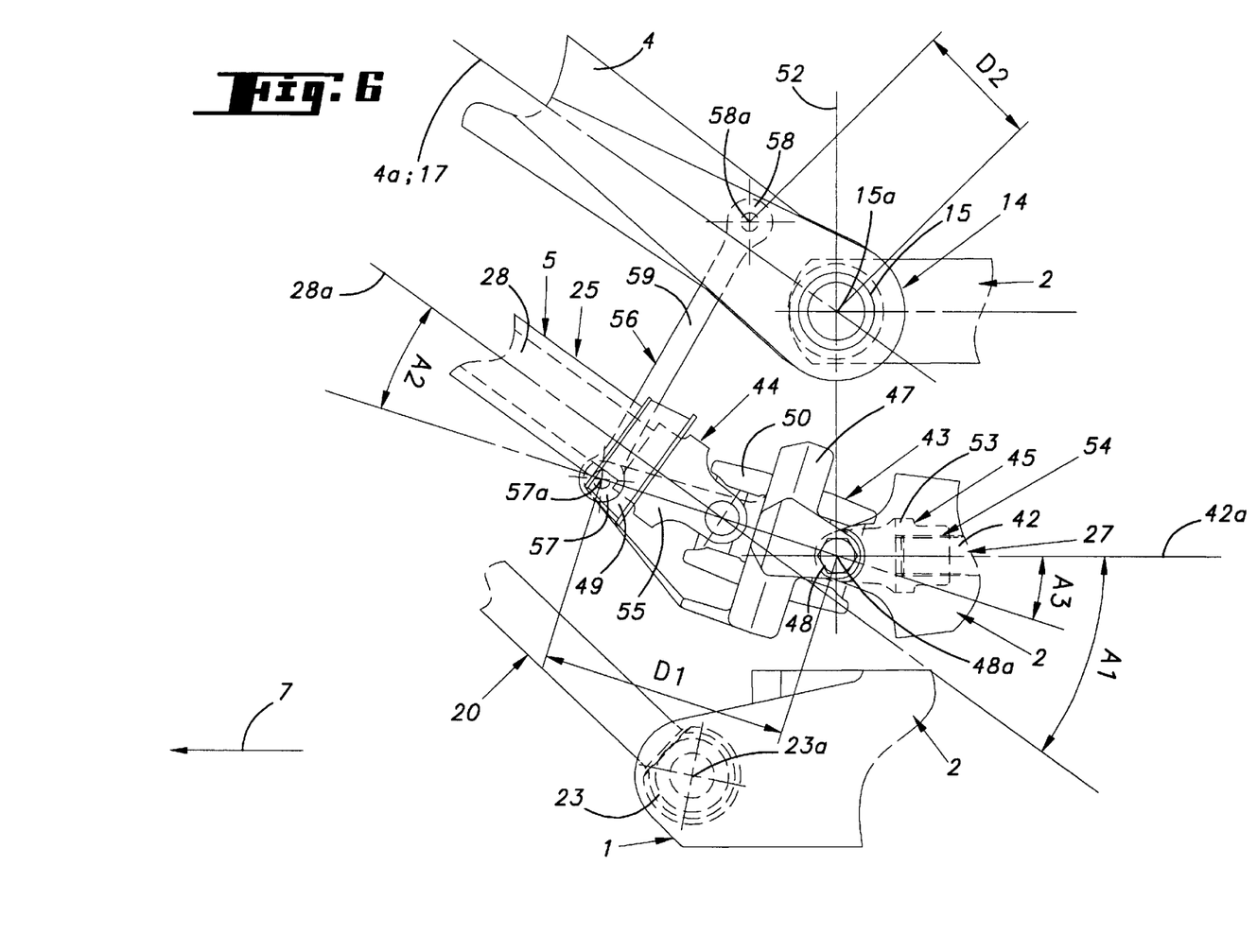
FIG. 6 depicts the same elements as FIG. 4, but in a working position to the left.

It will also be noted in the light of FIGS. 4 to 6, that the geometric axis 15a of the first articulation 15 and the geometric axis 48a of the fourth articulation 48 extend at least roughly in a vertical plane 52 which extends at least roughly orthogonally to the direction of forward travel 7 during work.

According to the embodiment depicted, it will further be noted that the fourth universal joint 45 additionally comprises a pair of jaws 53 connected to the input shaft 42 by means of a sliding connection 54 allowing relative movement between them along the axis 42a of rotation of said input shaft 42. Such an embodiment advantageously makes this assembly easier to mount and makes it possible to eliminate assembly stresses to which the various articulations might be subjected.

The third universal joint 44, for its part, additionally comprises a pair of jaws 55 fixed to the corresponding end of the first drive shaft 28. This drive shaft is therefore produced in the form of a telescopic shaft, and this in particular makes it possible to compensate for variations in length which occur in the drive line as the drawbar 4 pivots about the geometric axis 15a of the first articulation 15 and thus allows motion to be transmitted correctly as said drawbar 4 pivots.

To ensure that the third coupling 43 is correctly positioned for all positions of the drawbar 4, the carrier member 47 is oriented accordingly about the geometric axis 48a of the fourth articulation 48. For this purpose, there is an orientation member 56 connected, on the one hand, to the carrier member 47 by means of a fifth articulation 57 of geometric axis 57a and, on the other hand, to the drawbar 4 by means of a sixth articulation 58 of geometric axis 58a.

This orientation member 56 consists, in the embodiment depicted, of a strut 59 articulated between the carrier member 47 and the drawbar 4 by means of the fifth articulation 57 and the sixth articulation 58.

In FIGS. 4, 5 and 6 it can also be seen that the orientation member 56 forms a deformable quadrilateral with the drawbar 4, the chassis 2 and the carrier member 47.

It will further be noted that the distance D1 between the geometric axis 48a and the geometric axis 57a is approximately twice the distance D2 between the geometric axis 15a and the geometric axis 58a. An arrangement of the geometric axes 48a, 57a, 15a, 58a of this kind advantageously allows the third universal joint 44 and the fourth universal joint 45 to be subjected to less load. In particular, it can be seen in FIGS. 5 and 6, that the angle A2 of the third universal joint 44 and the angle A3 of the fourth universal joint 45 are each equal to roughly half the angle A1 between the axis 28a of rotation of the first drive shaft 28 and the axis 42a of rotation of the input shaft 42.

This mower 1 works as follows.

In FIGS. 1 and 2 it can be seen that the mower 1 in the transport position extends in line with the tractor vehicle 13 and the harvester mechanism 3 extends roughly transversely to the direction of forward travel 7.

When the operator wishes to mow a strip of standing product located to the right of the tractor vehicle 13, he operates the operating element 20 in such a way that this element shortens. This has the effect of pivoting the chassis 2 and the harvester mechanism 3 about the geometric axis 15a of the first articulation 15. During this pivoting, the carrier member 47 is automatically pivoted by the appropriate amount about the geometric axis 48a of the fourth articulation 48 by means of the strut 59, and this makes it possible to ensure that the motion of the first drive shaft 28 is correctly transmitted to the input shaft 42 because the angle A1 between these shafts 28, 42 is roughly halved at each universal joint 44, 45 of the third coupling 43.

The operator then powers the mower 1 from the tractor vehicle 13. The motion is transmitted in succession by the transmission shaft 35 with universal joints, the first transmission gearbox 32, the first coupling 33, the second drive shaft 29, the second coupling 37, the first drive shaft 28, the third coupling 43 and the input shaft 42. This input shaft 42 then drives a belt transmission 61 which also forms part of the second set 27. This belt transmission 61 extends roughly parallel to the chassis 2, that is to say transversely to the direction of forward travel 7 during work.

The belt transmission 61 is in a driving connection with a third set 62 of transmission members. This set essentially consists of a second transmission shaft 63 with universal joints which extends roughly in the direction of forward travel 7 during work. This second transmission shaft 63 with universal joints transmits the motion to a fourth set 64 of transmission members. This set particularly comprises a second transmission gearbox 65 located on the harvester mechanism 3, said second transmission gearbox 65 then driving the cutter members 9 of said harvester mechanism 3 in a way known to those skilled in the art.

At the end of the lot, the operator makes an about-turn and comes back in the opposite direction, this time mowing a strip of standing product lying to the left of the tractor vehicle 13. To do this, the operator operates the operating element 20 in the opposite direction, so that this member lengthens. In doing so, the chassis 2 and the harvester mechanism 3 pivot about the geometric axis 15a of the first articulation 15 as far as the other work position (not depicted), passing through the transport position depicted in FIG. 1. During this pivoting, the carrier member 47 is automatically pivoted by the appropriate amount about the geometric axis 48a of the fourth articulation 48 by means of the strut 59. It will be noted that, throughout the phase of coming into the work position to the left, the harvester mechanism 3 is driven by means of the transmission members 5 as described earlier.

To return to the transport position depicted in FIG. 1, or to the work position to the right, the operator proceeds in the same way as was described earlier, operating the operating element 20 to make it shorten.

Figure 7:
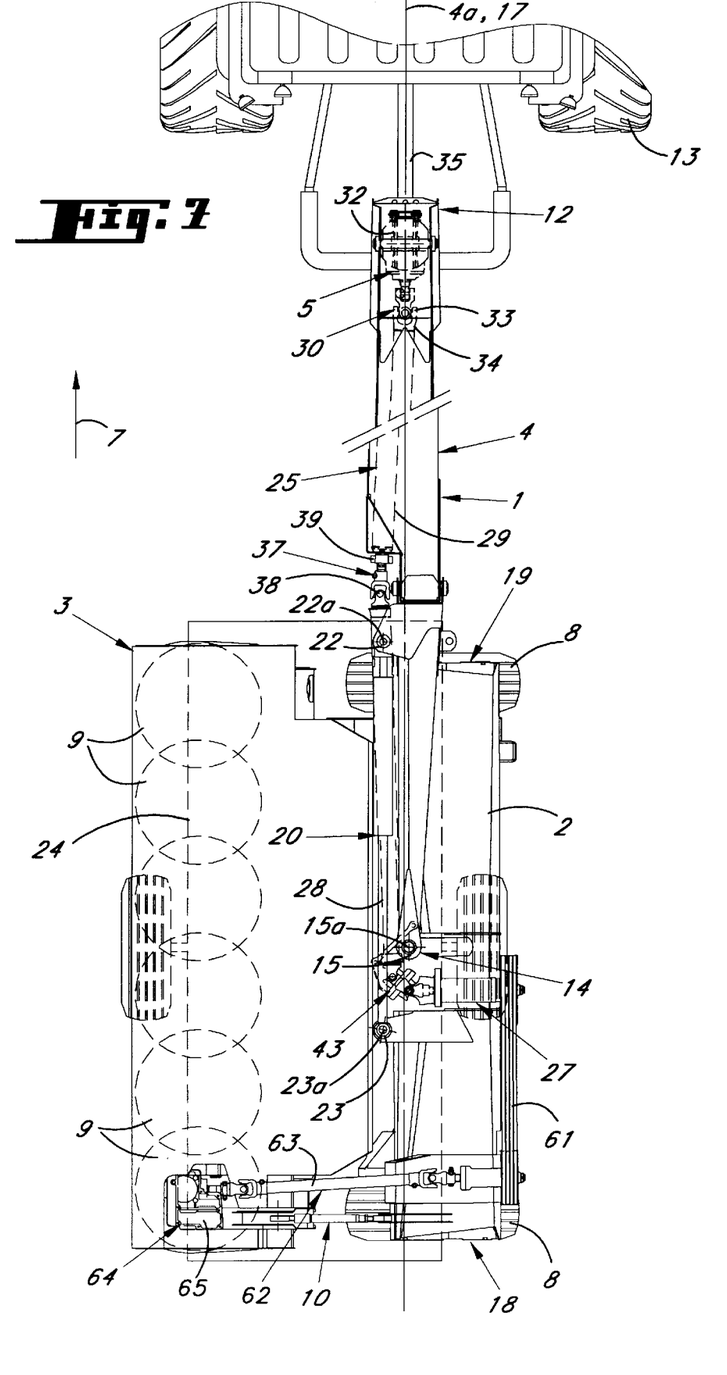
FIG. 7 depicts a view from above, partially in section, of the agricultural harvester in another transport position.

FIG. 7 shows another way of transporting the mower 1.

In this other transport position, the operating element 20 is lengthened to its maximum extent and the chassis 2 extends roughly parallel to the direction of forward travel 7 during transport. This other transport position requires, for example, a truck 24, which advantageously allows the mower 1 to be transported in a narrower width.

In order to be able to pivot the drawbar 4 into a position roughly parallel to the chassis 2, it will be noted that the third articulation 23, by means of which the operating member 20 is connected to the chassis 2, extends, with respect to the first articulation 15, on the opposite side to the side on which the drawbar 4 extends in this other transport position.

The same is true of the third coupling 43 and of the input shaft 42.

It will also be noted that said third articulation 23 extends somewhat further forward compared with the first articulation 15 when the mower 1 is in the work position.

Figure 8:
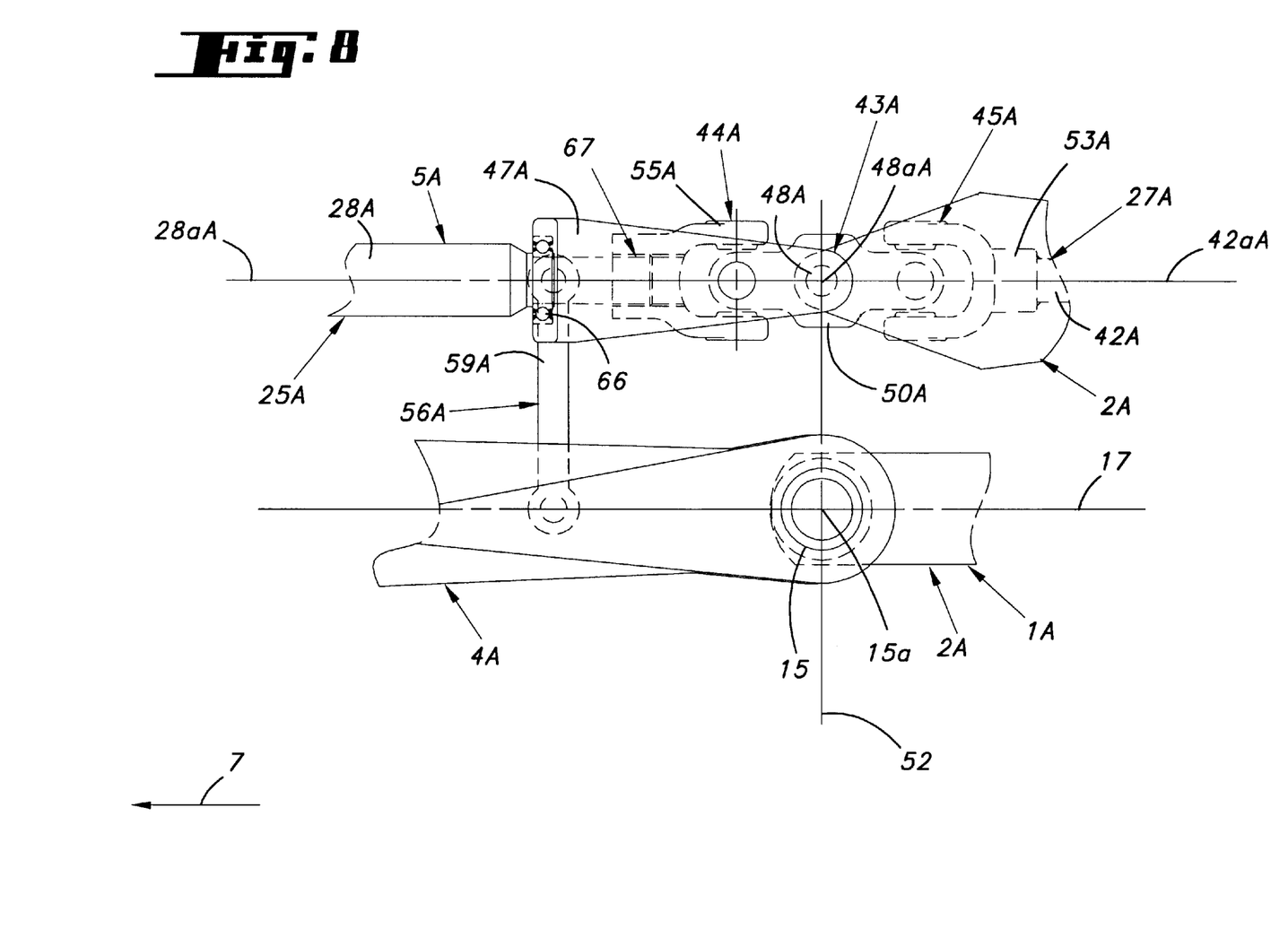
FIG. 8 depicts, to a different scale, part of an agricultural harvester according to a second embodiment.

FIG. 8 depicts a second embodiment of a mower 1A according to the invention. This second embodiment contains a certain number of components which were described earlier. These components will therefore keep the same reference numeral and will not be described again. It also contains a certain number of components which are comparable with components of the mower 1 described earlier. These components will be given the same reference numeral as the comparable components of the mower 1 and followed by the letter A. They will be described only where necessary.

The mower 1A depicted in FIG. 8 differs mainly from the first embodiment through the fact that the orientation member 56A (strut 59A) forms a deformable parallelogram with the drawbar 4A, the chassis 2A and the carrier member 47A.

It will also be noted that the geometric axis 48aA of the articulation 48A connecting the carrier member 47A to the chassis 2A extends in front of the center of the fourth universal joint 45A of the third coupling 43A and roughly at equal distances from the latter and from the center of the third universal joint 44A. When the drawbar 4A is in a position which is at least roughly orthogonal to the chassis 2A, the geometric axis 48aA roughly intersects a straight line passing through the centers of the third universal joint 44A and of the fourth universal joint 45A, this straight line being roughly coincident with the axis 42aA of rotation of the input shaft 42A.

It will also be noted, in the light of FIG. 8, that the first drive shaft 28A of the first set 25A of transmission members 5A is guided in rotation in the carrier member 47A by means of a rolling bearing 66.

It will also be noted that, in this second embodiment, the connection between the pair of jaws 55A of the third universal joint 44A and the first drive shaft 28A is a connection 67 that can slide along the axis 28aA of rotation thereof which, for example, makes it possible to have a rigid and non-telescopic drive shaft 28A. Furthermore, the pair of jaws 53A of the fourth universal joint 45A is, in this case, mounted so as to be stationary on the input shaft 42A of the second set 27A of transmission members 5A.

Finally, it will be noted that in this second embodiment, the third universal joint 44A and the fourth universal joint 45A also comprise a rigid double pair of jaws 50A.

Figure 9:
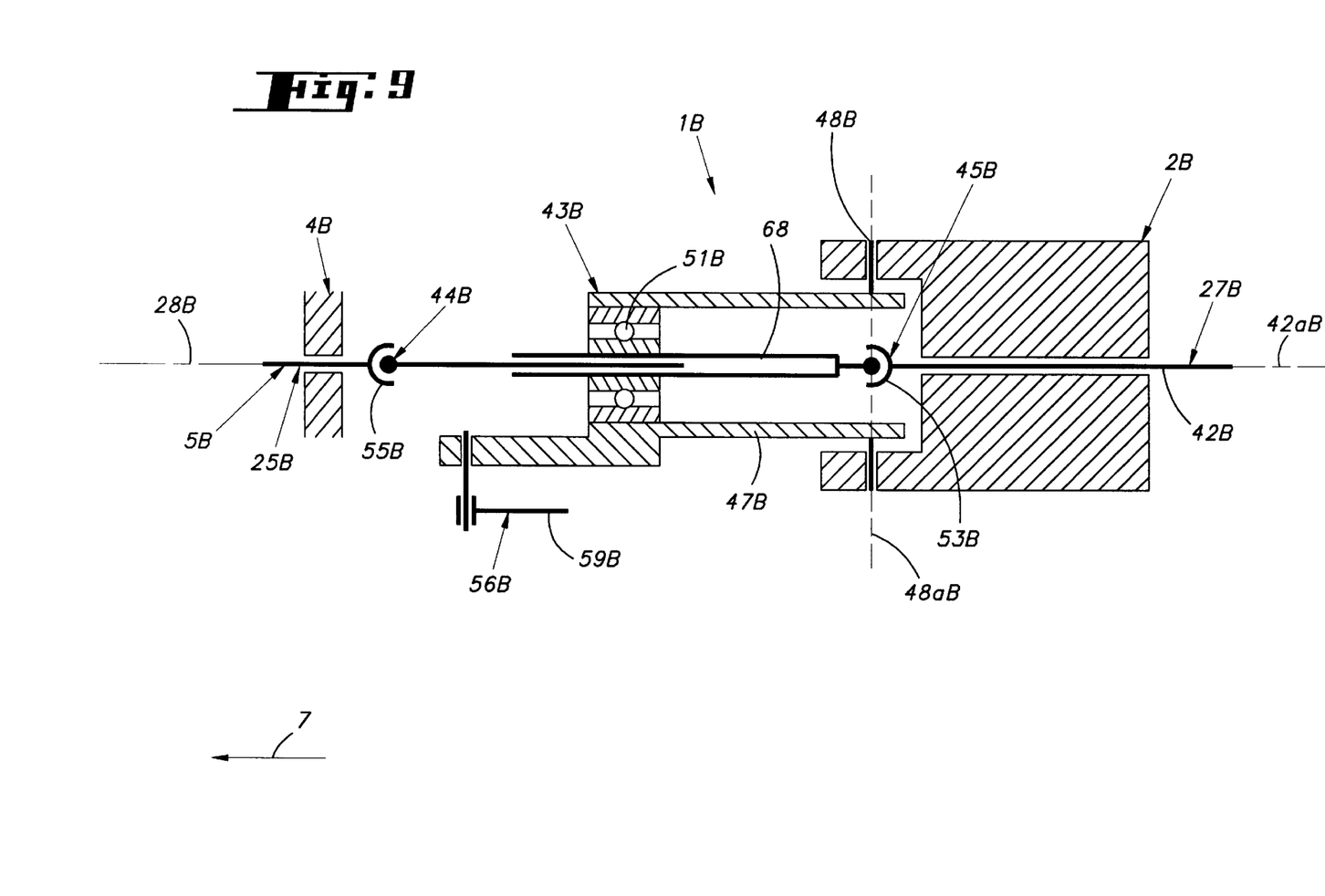
FIG. 9 diagrammatically depicts part of an agricultural harvester according to a third embodiment.

FIG. 9 depicts a third embodiment of a mower 1B according to the invention. This third embodiment contains a certain number of components which were described earlier. These components will therefore keep the same reference numeral and will not be described again. It also contains a certain number of components which are comparable with components of the mower 1 described earlier. These components will be given the same reference numeral as these comparable components of the mower 1 and followed by the letter B. They will be described only where necessary.

The part of the mower depicted in FIG. 9 mainly differs from the first embodiment through the fact that the pair of jaws 55B of the third universal joint 44B is stationary with respect to the first drive shaft 28B and that the pair of jaws 53B of the fourth universal joint 45B is stationary with respect to the input shaft 42B. To compensate for variations in length which occur in the drive line as the drawbar 4B pivots, provision is made for the third universal joint 44B and the fourth universal joint 45B to be telescopic with respect to each other along a geometric axis passing through the centers of said two universal joints 44B, 45B. For this purpose, it will be seen, in the light of FIG. 9, that there is a telescopic transmission shaft 68 between the third universal joint 44B and the fourth universal joint 45B. This telescopic transmission shaft 68 is guided in rotation in the carrier member 47B by means of a rolling bearing 51B.

Various modifications may be made to the embodiments which have just been described, particularly as far as the construction of the various components is concerned, or by substituting technical equivalents without in any way departing from the field of protection defined by the claims.

Thus, for example, it is perfectly feasible for the drive shafts 28, 29; 28A, 29; 28B, 29 to be made as a single piece extending at least partially out from the drawbar 4; 4A; 4B. There may also be a guard 49 which at least roughly envelops the third coupling 43; 43A; 43B and that part of said single-piece drive shaft which extends out from said drawbar 4; 4A; 4B.

What is claimed as new and desired to be secured by Letters Patent of the United States is:

1. cultural harvester comprising:
   a chassis extending, during work, transversely to the direction of forward travel;
   a harvester mechanism suspended moveably in the chassis by means of a suspension device;
   a drawbar connected to the chassis by means of a first articulation, the geometric axis of which is at least roughly vertical, said drawbar being intended to connect the harvester to a tractor vehicle;
   transmission members intended to transmit the motion from a source of motor power to the harvester mechanism and comprising, in particular:
      a first set supported by the drawbar and comprising at least a first drive shaft;
      a second set supported by the chassis and comprising at least one input shaft, the axis of rotation of which is, during work, directed at least roughly in the direction of forward travel;
      a coupling comprising a universal joint by means of which it is connected to the first drive shaft and another universal joint by means of which it is connected to the input shaft; wherein:
         the axis of rotation of the input shaft is offset with respect to the geometric axis of the first articulation connecting the drawbar to the chassis;
         the first drive shaft or the coupling are guided in rotation in a carrier member connected to the chassis by means of another articulation, the geometric axis of which is at least roughly vertical and at least roughly intersects the axis of rotation of the input shaft;
         an orientation member is connected between the carrier member and the drawbar.

2. Agricultural harvester as claimed in claim 1, wherein the universal joint and the other universal joint of the coupling have a rigid double pair of jaws.

3. Agricultural harvester as claimed in claim 2, wherein the connection between the universal joint and the first drive shaft is a connection that can slide along the axis of rotation thereof.

4. Agricultural harvester as claimed in claim 2, wherein the connection between the other universal joint and the input shaft is a connection that can slide along the axis of rotation thereof.

5. Agricultural harvester as claimed in claim 2, wherein:
   a corresponding pair of jaws of the universal joint is stationary with respect to the first drive shaft;
   the first drive shaft is a telescopic shaft.

6. Agricultural harvester as claimed in claim 1, wherein:
   a corresponding pair of jaws of the universal joint is stationary with respect to the first drive shaft;
   a corresponding pair of jaws of the other universal joint is stationary with respect to the input shaft;
   the universal joint and the other universal joint are telescopic with respect to one another about a geometric axis that passes through the centers of the two universal joints.

7. Agricultural harvester as claimed in claim 1, wherein:
   the first drive shaft is guided in rotation in the carrier member;
   the geometric axis of the other articulation connecting the carrier member to the chassis intersects the geometric axis passing through the centers of the two universal joints at least roughly midway between said centers when the drawbar is in a position at least roughly orthogonal to the chassis.

8. Agricultural harvester as claimed in claim 1, wherein:
   that part of the coupling which lies between the two universal joints is guided in rotation in the carrier member;
   the geometric axis of the other articulation connecting the carrier member to the chassis passes at least roughly through the center of the other universal joint.

9. Agricultural harvester as claimed in claim 7, wherein the geometric axis of the first articulation and the geometric axis of the other articulation extend at least roughly in a vertical plane which runs at least roughly orthogonally to the direction of forward travel during work.

10. Agricultural harvester as claimed in claim 1, wherein the orientation member forms a deformable quadrilateral with the drawbar, the chassis and the carrier member.

11. Agricultural harvester as claimed in claim 10, wherein the quadrilateral is at least roughly a parallelogram.

12. Agricultural harvester as claimed in claim 1, wherein the orientation member consists of a strut articulated between the drawbar and the carrier member.

13. Agricultural harvester as claimed in claim 1, wherein, in side view, the geometric axis of the other articulation, considered from the bottom upward, is inclined forward slightly.

14. Agricultural harvester as claimed in claim 1, wherein, in side view, the geometric axis of the first articulation, considered from the bottom upward, is inclined backward slightly.

15. Agricultural harvester as claimed in claim 1, wherein:
   the first set of transmission members comprises a second drive shaft which transmits the motion from the front of the drawbar to the first drive shaft;
   the first drive shaft and the second drive shaft are coupled together by means of a second coupling.

16. Agricultural harvester as claimed in claim 15, wherein the second coupling consists of a universal joint.

17. Agricultural harvester as claimed in claim 15, wherein the first drive shaft and the second drive shaft are supported directly by the drawbar by means of a single bearing extending in the vicinity of the second coupling.

18. Agricultural harvester as claimed in claim 17, wherein the bearing is connected to the drawbar by means of elastic rests.

19. Agricultural harvester as claimed in claim 17, wherein the bearing is mounted on the second drive shaft.

20. Agricultural harvester as claimed in claim 15, wherein the axis of rotation of the second drive shaft is at least roughly coincident with the longitudinal axis of the drawbar.

21. Agricultural harvester as claimed in claim 1, wherein:
   the coupling extends outside the drawbar;
   the first drive shaft emerges from the drawbar;
   there is provided a guard which at least roughly envelops the coupling and that part of the first drive shaft which emerges from the drawbar.

22. Agricultural harvester as claimed in claim 1, wherein:
   the drawbar can be pivoted into a transport position in which it extends at least roughly parallel to the chassis;
   the axis of rotation of the input shaft extends, with respect to the first articulation, on the opposite side to the side on which the drawbar extends in the transport position.

* * * * *